April 24, 1934. E. OLMO 1,956,333
SUBMARINE BARRIER AND LAUNCHING AND ARMING MEANS THEREFOR
Filed March 16, 1932 14 Sheets-Sheet 1

E. Olmo
INVENTOR

By: Marks & Clark
ATTYS.

April 24, 1934.  E. OLMO  1,956,333
SUBMARINE BARRIER AND LAUNCHING AND ARMING MEANS THEREFOR
Filed March 16, 1932  14 Sheets-Sheet 5

E. Olmo
INVENTOR

By Marks & Clerk
ATT'YS

April 24, 1934. E. OLMO 1,956,333
SUBMARINE BARRIER AND LAUNCHING AND ARMING MEANS THEREFOR
Filed March 16, 1932 14 Sheets-Sheet 9

E. Olmo
INVENTOR

By: Marks & Clerk
Attys.

April 24, 1934.  E. OLMO  1,956,333
SUBMARINE BARRIER AND LAUNCHING AND ARMING MEANS THEREFOR
Filed March 16, 1932  14 Sheets-Sheet 10

E. Olmo
INVENTOR

By: Marks & Clerk
Attys.

April 24, 1934.  E. OLMO  1,956,333
SUBMARINE BARRIER AND LAUNCHING AND ARMING MEANS THEREFOR
Filed March 16, 1932  14 Sheets-Sheet 11

E. Olmo
INVENTOR

By Marks & Clerk
Attys.

April 24, 1934. E. OLMO 1,956,333
SUBMARINE BARRIER AND LAUNCHING AND ARMING MEANS THEREFOR
Filed March 16, 1932 14 Sheets-Sheet 13

April 24, 1934.  E. OLMO  1,956,333
SUBMARINE BARRIER AND LAUNCHING AND ARMING MEANS THEREFOR
Filed March 16, 1932  14 Sheets-Sheet 14

E. Olmo
INVENTOR

By: Marks & Clerk
Attys.

UNITED STATES PATENT OFFICE 1,956,333

SUBMARINE BARRIER AND LAUNCHING AND ARMING MEANS THEREFOR

Enrico Olmo, Milan, Italy

Application March 16, 1932, Serial No. 599,306
In Italy March 18, 1931

13 Claims. (Cl. 114—241)

The present invention relates to subaqueous barriers against surface craft and especially against submarines, the barriers comprising:

(a) A system of anchored buoys and of top ropes extending from each buoy to the next in order to secure the barrier thereto, the whole being arranged at a suitable depth below the water surface;

(b) One or more net sections being submerged to a convenient depth, such sections being eventually subdivided by means of lines of breaking members which permit a portion of the net to be detached from the top rope and eventually from the remainder of the net under the action of a certain mechanical stress;

(c) A system of floats serving to support the whole or a portion of the net, and eventually to support also other parts of the barrier, which parts too should preferably be maintained at a depth of some metres below the water surface;

(d) Auxiliary systems, according as may be required, of explosive charges, signalling or other apparatus which under predetermined conditions shall effect signals, explosions or other actions useful for war purposes.

Barriers of the said type can be laid down rapidly and even automatically by employing, for their mooring, automatic anchorage buoys such as are already in use for mines, with or without change, and of the types in which the anchor alone sinks to the bottom. Such buoys must be anchored with the utmost accuracy with a preestablished spacing between each buoy and the next according to the preestablished lay-out.

The intermediate buoys will serve for one of the anchorings of each of two adjacent barrier sections. The end buoys will serve for anchoring one end of the barrier section adjacent to the buoy.

The invention is clearly illustrated in the accompanying drawings, in which:—

Figs. 24 and 25 in elevation and plan respectively, Figs. 26 and 27 in elevation an plan respectively, and Figs. 28 and 29 in elevation an plan respectively illustrate different position assumed by another form of the bobbin illustrated in Figs. 14, 15, 16, 17, 18 and 19.

Fig. 37 shows schematically the folding in loops effected by the form shown in Figs. 24 and 25.

The laying of the barriers of the types abovesaid can be readily and automatically carried out by employing, for each barrier section comprised between two adjacent buoys, B, B one or more floating bobbins Br on which have been previously mounted, in the manner that will be set out further on, the top rope Ra and the net displaying or extending device hereinafter described, the net R, the explosive charges Ce, the apparatus for signalling and for other war purposes, or a portion of such items, so as to allow the bobbin in the water, at the moment of its use, to unload into the water the parts loaded thereon in such a manner that the said parts can take up, in the barrier, the position and function allotted to them. The buoys B are of the automatic anchoring type and include anchors A operably connected to the body of each buoy by a moving rope Co.

Figure 7:
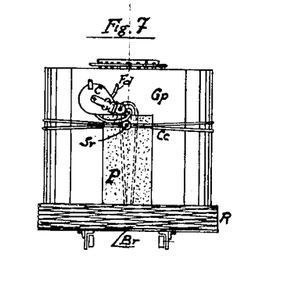
Fig. 7 is an enlarged elevational detail of the bobbin shown at the central part of the top of Fig. 1.
Figure 8:
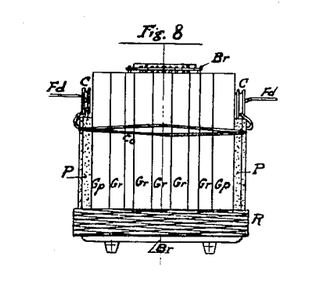
Fig. 8 is a similar view taken on right angles to Fig. 7.

The said bobbin may also be fitted with a roller carriage (Figs. 7 and 8) having the same gauge as the roller carriages that serve for launching the buoys, so that the bobbin may also travel on tracks provided on board the ship.

The winding of the net and the mounting of all the parts that are to be arranaged on the bobbin must be carried out with the utmost care in order to prevent the mentioned parts from becoming entangled with one another on their being unwound from the bobbin.

According to the present invention, therefore, the bundle of the wires forming the net R, and the various ropes for attachment to the floats may be previously arranged in a continuous or discontinuous protection sheath formed, for instance by applications of a gluing material or by winding a paper band around them or the like. At all events, according to the invention, material employed for the sheath should be sufficiently strong as long as they are dry and show but little strength after prolonged submersion in water, so that the said sheath will facilitate the regular winding-on of the bobbin and its unwinding in the water without the net becoming entangled.

In order to render easy, secure and speedy the unwinding of the net and top rope with their above-mentioned appurtenances from the bobbin, the top rope Ra and the net R prior to winding are so folded in loops that the two net ends which have got to be secured to two different mooring and extending winches C, after completion of the winding, come to lie at the outer surface of the wound bobbin and at two opposite ends thereof.

Figure 11:
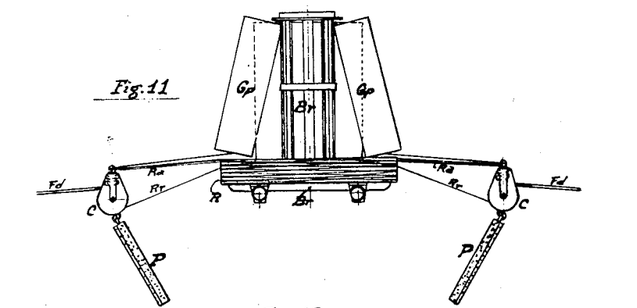

According to the invention the net extending operation may be performed by means of a device in which the ropes may also serve to indicate the distances at which the buoys must, one after the other, be launched into the sea, and to eventually control the member serving to release the buoy and bobbin launching apparatus. According to the invention, the net extending or displaying device comprises the ropes Fd (Figs. 1 to 4), the counterweights P, and the travelling floats Gp (Figs. 1 to 13). For each bobbin, two counterweights P and two ropes Fd may be provided, each of the ropes having one of its ends directly attached to the corresponding mooring buoy B. To each rope Fd a counterweight P is directly attached (Fig. 11), or the counterweight is carried by a movable pulley, C, round which the rope Fd passes on its way to its fixed point on the hood of the pulley C, the hood being carried by the travelling float Gp to be hereinafter described.

Figure 22:
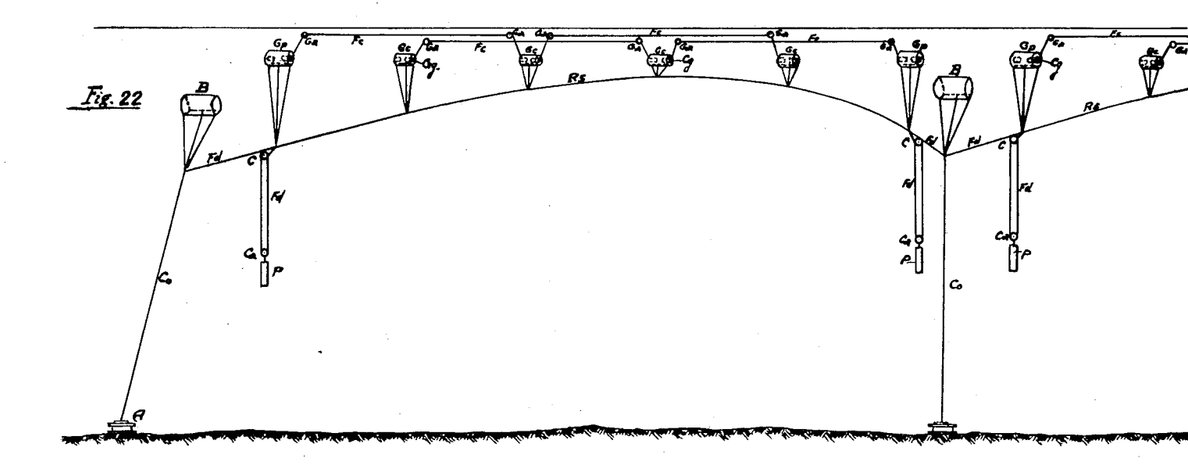
Figs. 22 and 23 shown in elevation an plan the barrier section at the end of the barrier under the effect of currents flowing in a direction oblique to the barrier.

This second arrangement should be used when it is desired that for a given displacement of the counterweight there shall be a corresponding displacement of twice that amount of rope Fd (Fig. 22). Each of the said ropes, prior to reaching the counterweight, passes over a pulley Ca supported by the corresponding travelling float and is also attached to one of the ends of the bobbin to be unwound.

The free length of each of the said ropes should be made equal to or greater than half the distance existing between the buoys between which the rope is to be stretched.

Figure 1:
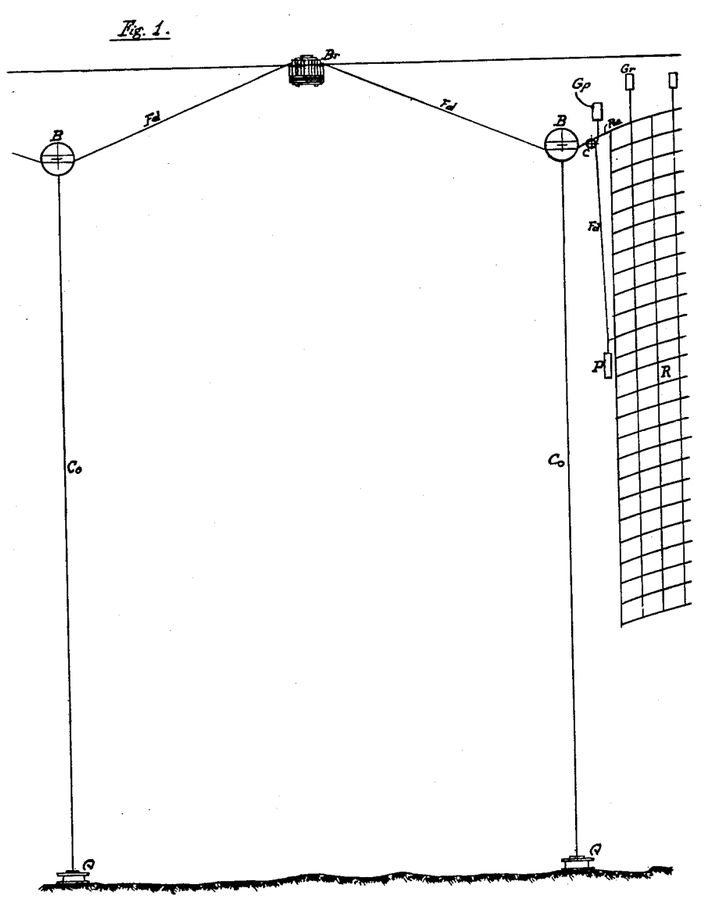
Fig. 1 is a side elevational view showing between two buoys the condition of a barrier section when the buoys and bobbins have already been launched overboard from the barrier-laying ship and previous to the commencement of the extension of the material carried on the bobbin while in the right is seen the head of a barrier section already extended.
Figure 2:
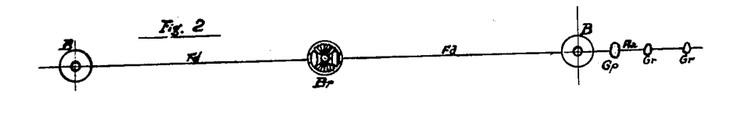
Fig. 2 is a plan view of Fig. 1 showing the bobbin still carrying all the material which after extension will form the barrier section between the two buoys.
Figure 3:
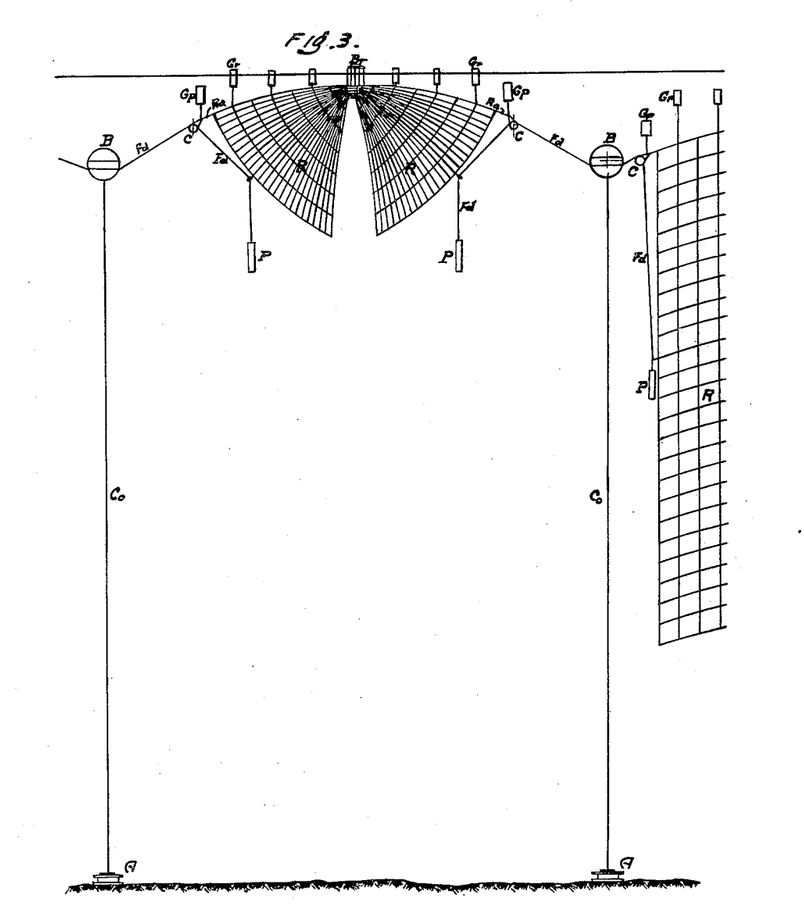
Fig. 3 is a side elevational view of the same barrier section illustrated in Figs. 1 and 2 but with the extension of the material for the barrier already initiated.
Figure 4:
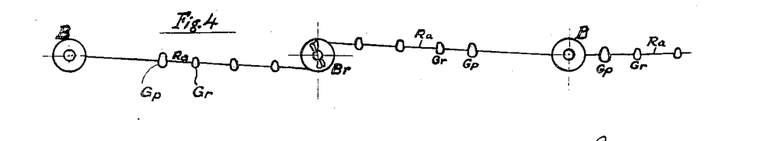
Fig. 4 is a plan view of the arrangement shown in Fig. 3.
Figure 5:
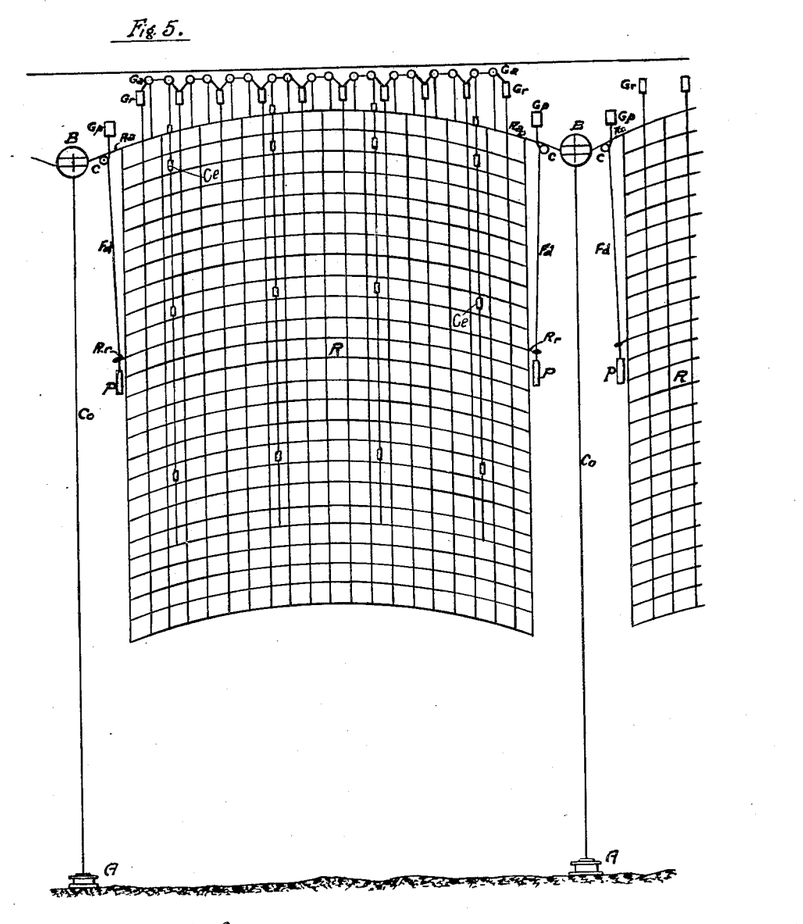
Fig. 5 is a side elevational view of the same section of the barrier as illustrated in Figs. 1, 2, 3 and 4 showing the complete extension of the barrier section with the addition of auxiliary meshes.
Figure 6:
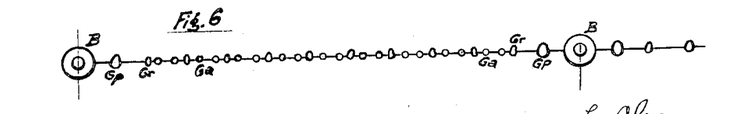
Fig. 6 is a plan view of the arrangement shown in Fig. 5.
Figure 10:
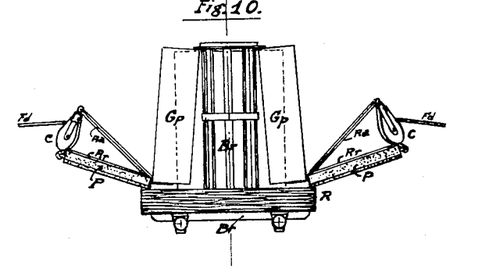

In practice, at the moment when the extending of the net between two buoys B is started, the two buoys must be already anchored at a suitable distance from each other and at a convenient depth. At an intermediate point between the two buoys there shall be the bobbin Br, with the two ends of the net R already permanently attached each to the respective pulley C, the pulleys C being arranged on the bobbin Br, one on one side and the other on the other side thereof and being attached each of them to the corresponding float Gp (Fig. 1). At the suitable moment, as soon as it will have been released by the corresponding release or stop Sv (Fig. 7), the net extending device will come into action. Each of the two counterweights P sinks (Figs. 10 and 11) and the two pulley C supported by their traveling floats Gp move away from the bobbin Br in opposite directions towards the corresponding buoys B, even when submerged, and stop in the vicinity of the latter, thereby carrying along with them the top net ropes Ra and thus securing the complete extension of the net R.

According to the invention the next extending device, travelling float, counterweight with all its appurtenances exclusive of the ropes, are mounted on the bobbin (Figs. 7—8—9) together with all other parts that can be mounted on the bobbin. When the bobbin in the water thus commences the net extending operation, the two sets making up the travelling float and the counterweight (Fig. 11) are the first to leave the bobbin and sink below water surface; then follow the net, the net-supporting floats and the explosive charges which go to occupy the preestablished position in the barrier along with all the other parts that had been mounted on the bobbin, as said above.

The firm connection between the said parts insured with the most varied mechanical means namely with a binding rope Rr (Figs. 5—10—11—12—13) or with any other suitable clamping device adapted to be maintained in locking position up to the moment when the releasing device spoken of below for the next extending device will be operated.

The bobbins complete with the net extension device are provided with a releaser or extension retarder Sv (Fig. 7), which has already been mentioned above. In a first stage, viz. up to the moment suitable for the extension of the net, the said releaser or retarder maintains in locked conditions the members that hold firmly tied together the net extending device (built up by the two counterweights and floats) and the bobbin with its appurtenances.

The working of the releaser or retarder takes place with an (eventually adjustable) time lag sufficient to insure that the time required for the launching of both mooring buoys and for their regular anchoring will have elapsed.

The working of the releaser or retarder permits of slackening the binding or any other member holding the bobbin ends and the net extension device. The net extention counterweights P (Figs. 10—11), being no longer withheld by the rope, drop to the outside and entrain each of them the corresponding pulley and travelling float as well as the net end connected to the pulley. From this moment, the extension of the net is free to take place under the action of the counterweights as explained above.

The releaser or retarder may consist, for instance, of a pin made of a salt soluble in water. The pin locks the two ends of the rope or of any other clamping means holding the bobbin and counterweights together up to the moment when the salt pin, after a predetermined period of submersion in water, dissolves and releases the parts formerly locked by it.

Figures 9, 13:
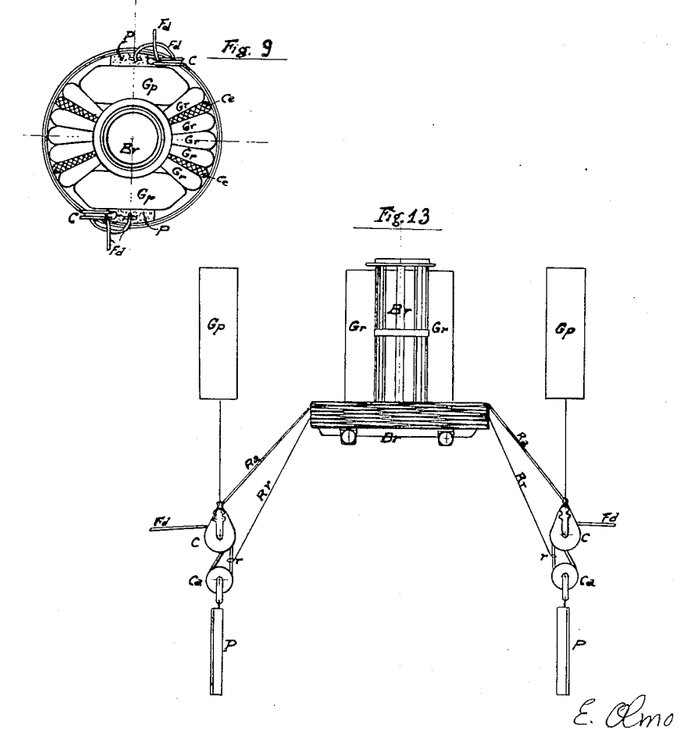
Fig. 9 is a plan view of said bobbin.
Figs. 10, 11, 12 and 13 are enlarged side elevational views of the same bobbin showing different positions assumed during extention.
Figure 12:
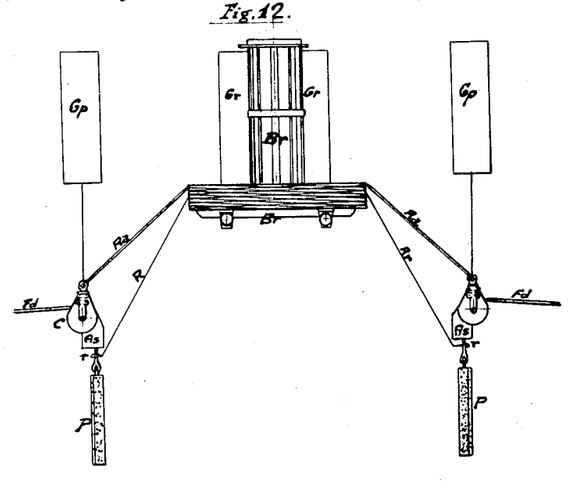
Figure 14:
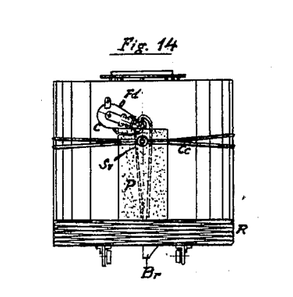
Fig. 14 is an enlarged side elevational view of a slightly modified form of bobbin shown in Fig. 7 with the sole difference that the floats are of a special form and have attachments allowing them to take up different directions in such a way that in addition to their hydrostatic upper thrust they may also have a hydrodynamic upper thrust in the presence of currents of a certain velocity.
Figure 15:
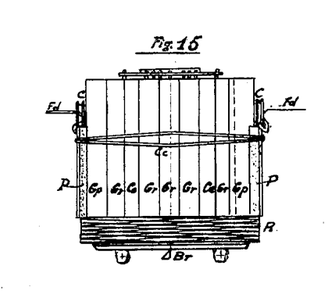
Fig. 15 is a view similar to Fig. 14 but at right angles thereto.
Figure 16:
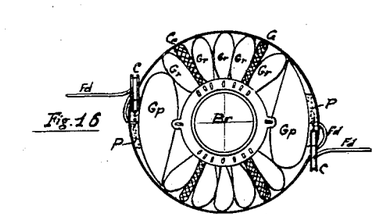
Fig. 16 is a plan of Fig. 14.
Figure 17:
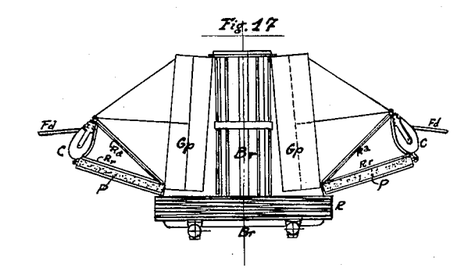
Figs. 17 and 18 are elevational details showing positions assumed by the bobbin during extension.
Figure 18:
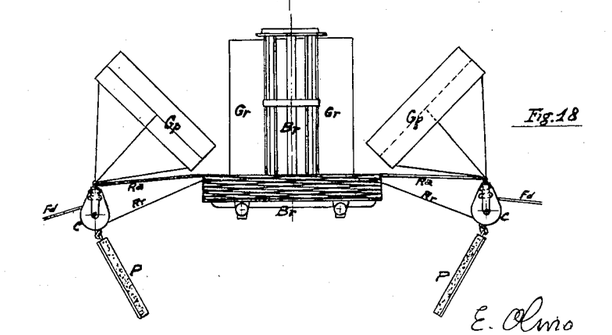

According to the invention, with a view toward effecting a better working of the barrier, the following auxiliary arrangement may be adopted. The rope leading to the counterweight is passed through the eye of a thimble —r— (Figs. 12 and 13). The said thimble is connected to a spot of the net head, this spot—when the net is completely extended—being at the same depth as the counterweight.

The thimble eye must be of such dimensions as to let the rope freely pass, but stop against the upper end of the counterweight without letting it pass through, in such a manner the thimble eye bears against the counterweight forcibly and causes a portion of the net weight to be carried on the counterweight, thus increasing the useful effect of the counterweight if the latter happens to take up a higher lever than it should in normal extended conditions of the net at the point where the thimble is attached. This method of connection offers the further advantage that the net is maintained at a minimum distance from the counterweight rope. Finally, this method of connection permits the utilization of the rope to which the counterweight is attached in hoisting the net when the net must be removed from the sea.

According to the invention, when it is desired to prevent a travelling float, along with the net extending counterweight and with the net head, from moving away from its mooring buoy under the action of external forces, a special holding device is secured to the net extension pulley, the holding device R, r, being threaded on the rope that leads to the counterweight As (Fig. 12). This holding device, while allowing the counterweight rope to run in counterweight sinking direction, acts in such a manner that the movements of said rope in opposite direction are completely prevented or are prevented only beyond a predetermined limit.

As already mentioned, the net supporting floats and, still more, the top rope must be maintained at a certain depth under water level (for instance 10 metres) in order to render them less visible and in order to enable them to better withstand the wave motion, so that under these conditions the barrier opposes no impediment to the craft passing over the barrier, not only to surface ships but even to submarines when only slightly submerged.

Figure 23:
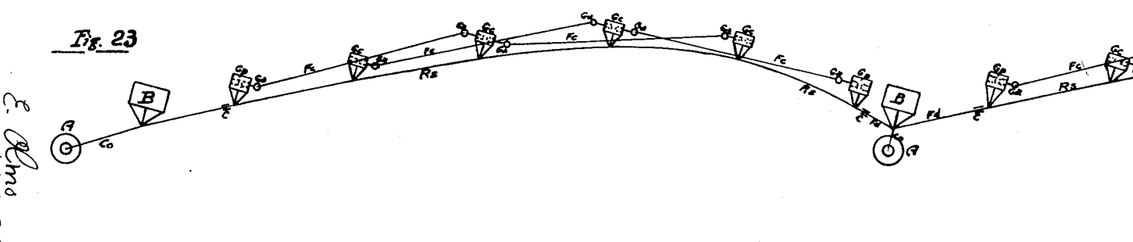
Figures 24, 25, 26, 37:
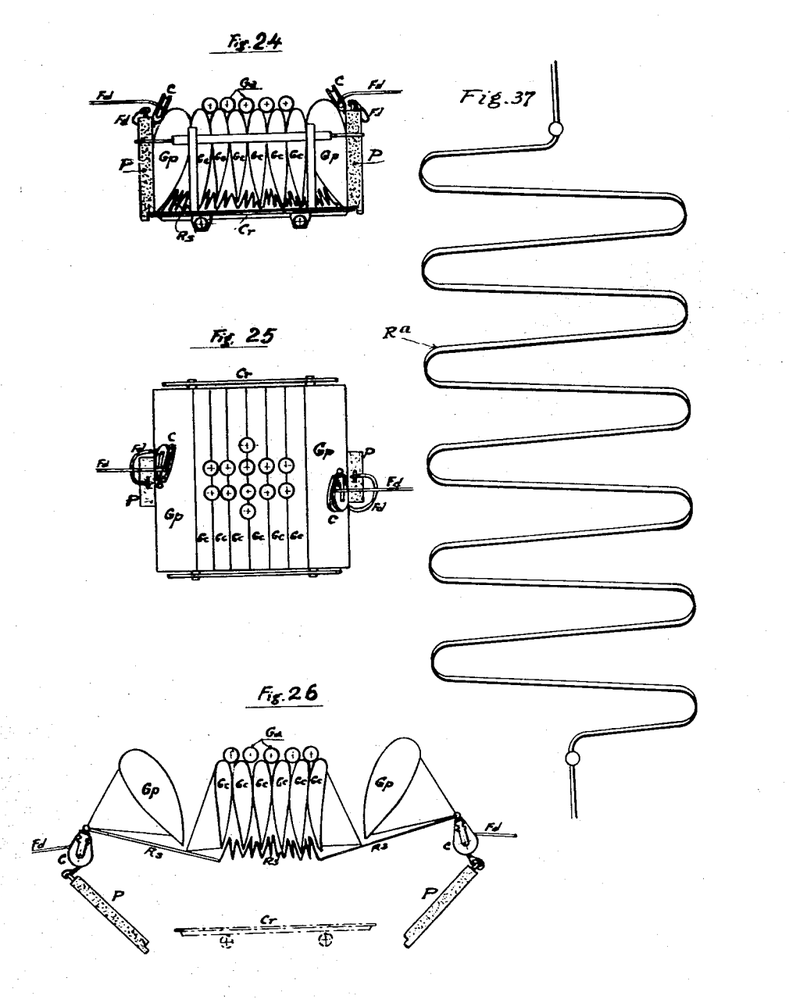
Figure 27:
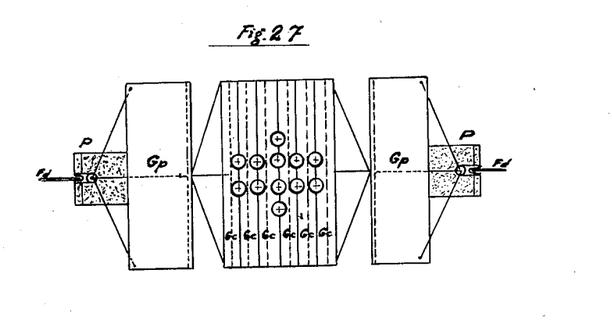
Figure 28:
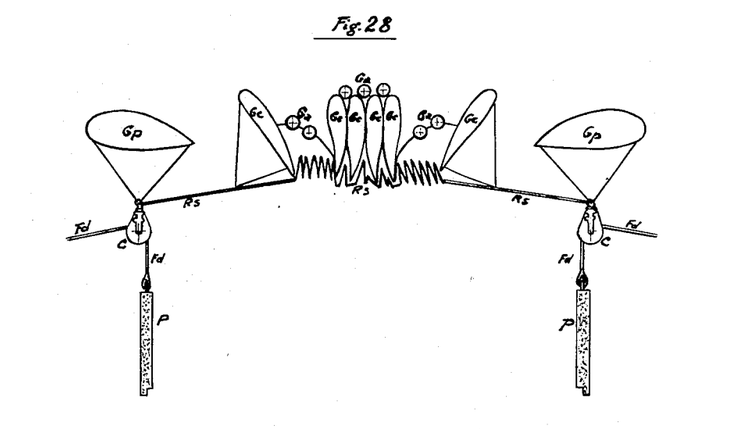

According to the invention, in order to prevent the passage over the barriers of larger ships and even of submarines, the ends of the cables controlling the ignition or the displacement of the explosive charges nearer to the water surface are extended above the top rope in order to permit the said explosive charges to be laid so as to come into contact with the ship. These auxiliary meshes may also be reduced to a single auxiliary mesh Fe (Fig. 22) represented by a rope supported by auxiliary floats; this rope extends horizontally a short distance under water level, and then one end thereof drops and connects to at least one explosive charge and the other end connects to the top rope or to the floats or to another explosive charge. These cables for the auxiliary meshes must be of sufficient strength in order that they may not be broken by running ships. The said cables are supported and brought near to the water level by means of auxiliary floats Ga (Figs. 22 and 23), which are very strong but of reduced dimensions in conformity with the moderate cable weight they are intended to carry.

The auxiliary floats Ga may also be fitted (Figs. 38 and 39) with apparatus of the kind of those already fitted to many mines, particularly to German mines, such apparatus being controlled by a hydrostatic piston operating when the hydrostatic pressure sinks below a predetermined limit. In this manner, when the auxiliary float reaches the predetermined immersion for which the hydrostatic device has been adjusted to operate, the said hydrostatic device will stop the auxiliary float either at the cable or at an auxiliary cable which too leads to the top rope.

Figure 38:
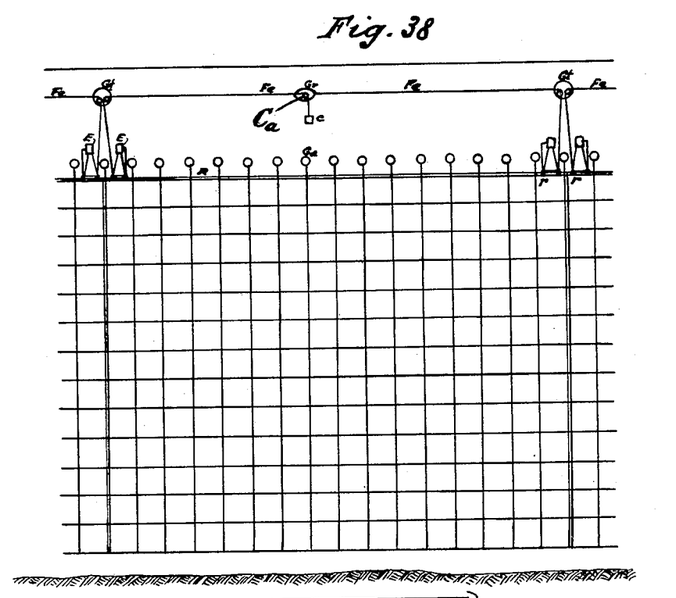
Figs. 38 and 39 show in detail a particular arrangement for the formation of auxiliary meshes.
Figure 39:
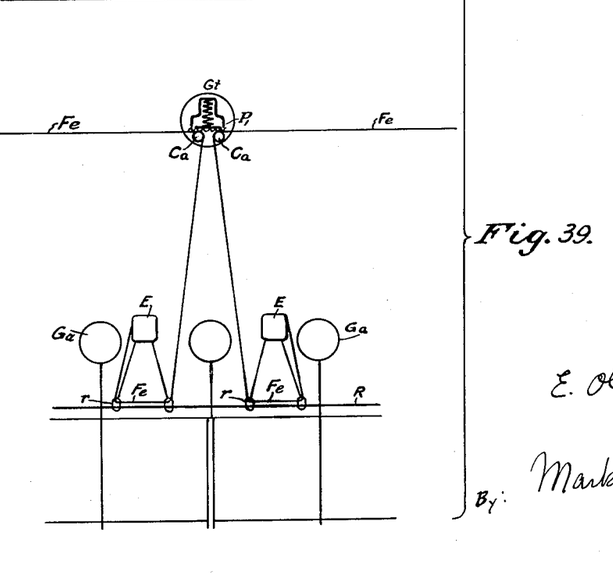

The cables for building auxiliary meshes may be held taught by means of counterweights C hanging on ropes that pass over pulleys Ca, as clearly shown on Figs. 38 and 39, in which a suitable float Gr will approximately equalize the water weight of the counterweight C and eventually of the cable.

Each auxiliary float Gr may also be utilized to support the cable Fe which builds adjacent auxiliary meshes.

In Fig. 38 a barrier portion is illustrated along with its top rope R, net with net-supporting floats Ga, auxiliary meshes supported by the floats Gt and built by the rope Fe, and explosive charges N secured to the top rope and tied to the end of the cable Fe.

Fig. 39 illustrates a detail of the attachment of the explosive charges to the rope Fe building the auxiliary mesh; it also diagrammatically shows (in the body of the float Gt supporting the auxiliary mesh) the hydrostatic piston Pi serving to stop the float Gt after the latter has moved enough to reach the desired point of submergence.

According to the invention, in order to secure a quick, easy and certain action of the explosive charges and their movement towards the ships that have struck the barrier, explosive charges (provided of course with suitable detonators like the preceding explosive charges) may be arranged back to back with, or threaded into, or incorporated in all or some of the floats supporting the top rope and in the travelling floats Cg (Fig. 22) care being taken, in this case, not to hinder the possibility for the floats to be orientated, as will be hereinafter mentioned.

Figure 29:
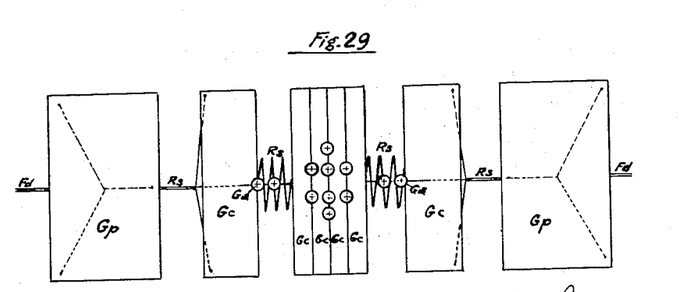
Figure 30:
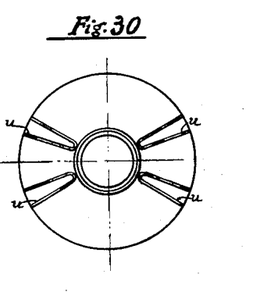
Figs. 30, 31, 34 and 36 illustrate a particular arrangement for the mounting of explosive charges on the bobbin as already described.
Figure 31:
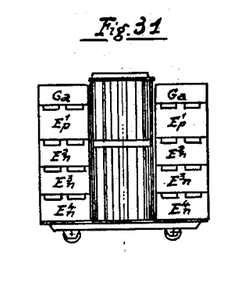

According to this invention, when it is desired to easily and quickly effect the unwinding of the bobbin only by the employment of said explosive charges connected to the auxiliary meshes to form the barrier for surface ships only, by simplifying the construction and the unwinding of the bobbin and by permitting same to be developed on larger extension of space, the net designed to prevent the passage of submersible boats will not be wound on the said bobbin. In this connection, however, the bobbin will support all the useful devices Fe (Figures 22 and 29).

According to the invention, in order to permit the explosive charges to detach themselves from the parts intended to support them and in order to enable the explosive charges to remain fast with their control cable notwithstanding the effect of a ship striking the cable, suitable breaking hooks secure the explosive charges to their supporting devices, the said breaking hooks being formed for instance, by rings, so that the explosive charges can detach themselves from the net if they are mounted on the net, from the top rope if they are attached to the latter, or from the float if they are placed back to back with the float, or so as to detach the floats if the explosive charges are incorporated in the float; all this for the purpose of allowing the explosive charge to be driven by the cable against the ship that has run into the cable.

According to the invention, in case of a cable controlling an explosive charge being struck by a ship, suitable breaking hooks may be employed in order to permit the detachment from the barrier also of the cable end that eventually is not connected to an explosive charge, no matter whether this cable end is or is not fast with a member intended to equalize the action exerted by the explosive charge attached to the opposite cable-end.

In order to better illustrate how the explosive charges are set in place in the barrier and in order to better illustrate the connections of the explosive charges with the other parts of the barriers and to show how they can work in the manner above described, reference is made to Fig. 9 wherein Ce are four columns of explosive charges; on suitable bobbins more or less than four columns of explosive charges can be arranged at will.

Each column of explosive charges (Fig. 34) is accommodated on the bobbin just in the same manner as one of the floats Gr, the external shape being approximately the same; in the progress of the net extending operations each column of explosive charges is dragged free into the water by the unwinding of the top rope, in the same manner as the floats Gr are dragged. The column of explosive charges is built (Fig. 34) by the superposition of two or more mines in such a manner that the total height of the column, inclusive of one or more floats for the control cable to be eventually arranged on the column top as will be explained below, does not exceed the height available for the floats.

All the said mines Ce will have the same cylindrical shape and ovoidal section (Fig. 9). The height of the individual mines will vary according to the desired power of the same and there will be at least two mine types; one type, which bears the reference $En$, will have a moderate height and a slight downward drift when placed in the water, whilst the other type which is indicated at $E'p$ will have a greater height and greater power and a slight upward drift when placed in the water (Figs. 31—34—35—36). The mine $E'p$ will be arranged at the top of the column, whilst two or more other mines will form the column base.

According to the invention, above the top mine the cable controlling the same will be arranged, one end of the cable being permanently attached to the upper portion of the mine $E'p$ and the other cable-end being attached either to a more distant point of the top rope, or to another explosive charge $E'p$ exhibiting the features mentioned above. This cable is suitably connected to the top rope or to the auxiliary floats intended to maintain this cable higher up than the top rope, in order to build the auxiliary mesh described above.

Figure 34:
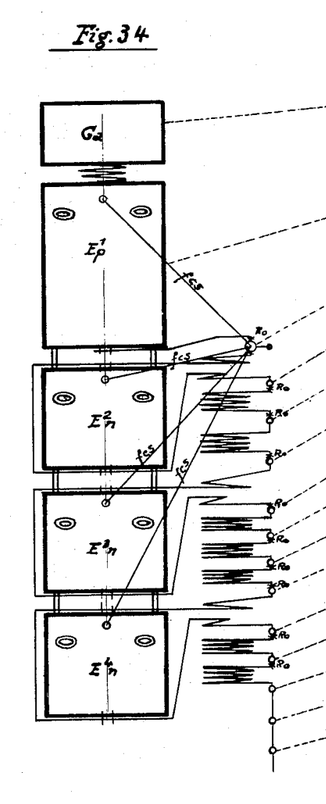
Figure 35:
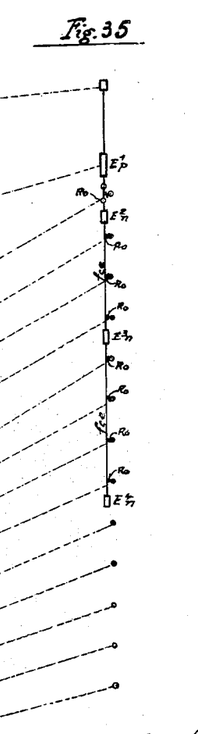
Fig. 35 is a plan view of explosive devices extended.
Figure 36:
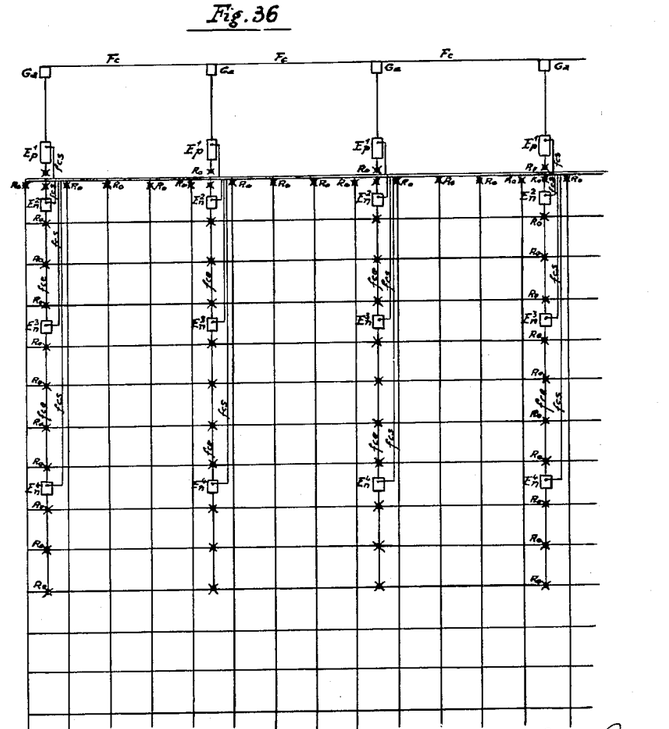

To the bottom of the mine $E'p$ a further cable, is attached, which through the intermediary of a breaking hook is connected to the top rope midway between the points where two vertical wires of the net are connected to the top rope by means of breaking hooks. To the same point of the top rope a small cable $f_{ce}$ is attached by means of a breaking hook; the small cable $f_{ce}$ is arranged like the other small cables forming the warp of the net, but is secured by means of breaking hooks to the horizontal small cables forming the net chain. This wire $f_{ce}$ is wound on the bobbin together with the net, but at convenient points of the said wire explosive charges Ce are connected to the mines $En$ forming the bottom portion of the column (Figs. 34 and 35). When the bobbin is unwinding in the water, the unwinding net and top rope drag into the water also the column of explosive charges. The mine $E'p$, owing to its slight upward drift, moves in upward direction whereas the mines $E^2n$, $E^3n$ . . ., owing to their slight downward drift, move in downward direction and stop at determined points according to the connections established between the said mines and the small cable $f_{ce}$ (Fig. 36). These connections must be so established that the various mines $En$ come to a standstill in the middle of a mesh of the net. The breaking hooks through which the small cable $f_{ce}$ is secured to the cross wires of the net serve to facilitate the operation of detaching the cable $f_{ce}$, along with all its mines $En$, from the net when the net is to be disarmed.

Figure 32:
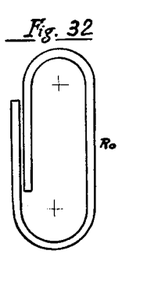
Figs. 32 and 33 in elevation and plan view illustrate one of the possible forms of the breaking hooks.
Figure 33:
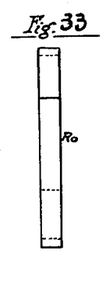

The mine $E'p$ is intended to be dragged against the ships that chance to strike the auxiliary meshes above the top rope. The mines $En$ are intended to drop, along with the net, on the submarines that chance to strike the net and thereby detach the net from the top rope by means of breaking hooks Ro clearly visible in Figs. 32 and 33.

In such cases, according to the invention, the charges of the mines $E'p$ and $E^2n$, $E^3n$, . . . laid on the barrier as indicated in the present description, may be actuated by firing ropes permanently connected to the top rope at the same point where the cable $f_{ce}$ is arranged, this cable provoking the explosion after the displacement of the mines has brought about the extension of a further length of firing rope. Alternately, according to the invention, the charges of the mines $E'p$ and $E^2n$, $E^3n$ . . . arranged in the barrier in the manner described may be actuated by impact and to this effect the said mines are fitted with a suitable number of movable tubes, in retracted position which move outwardly so as to project out of the mine twenty or more minutes after the bobbin has been put to sea thus permitting all the manipulations for the unwinding of the net to be performed without risk.

According to the invention, in order to secure better conditions for the barrier in the case of strong currents, a profile offering a minimum resistance to the currents is given to the floats or to a portion thereof and at the same time the floats are provided with an attachment device that will permit to the float to orientate itself in the most favorable manner according to the direction of the current.

It has been observed that the currents are stronger at the surface and consequently the more important effect is that which they exert on the floats, whereas the effect which they exert on the net proper built up of thinner wires and generally immersed at a greater depth is less important.

Yet, according to the invention, the conditions of the net under the current effects are improved by a suitable shaping given to the ropes or, better, to the wires of which the nets are made in such a manner as to considerably reduce their resistance to the currents. On the other hand, as the wires and ropes building up the net cannot alter their orientation when the currents are reversed, so we give to the net wires and ropes a suitable elliptical section.

Figure 19:
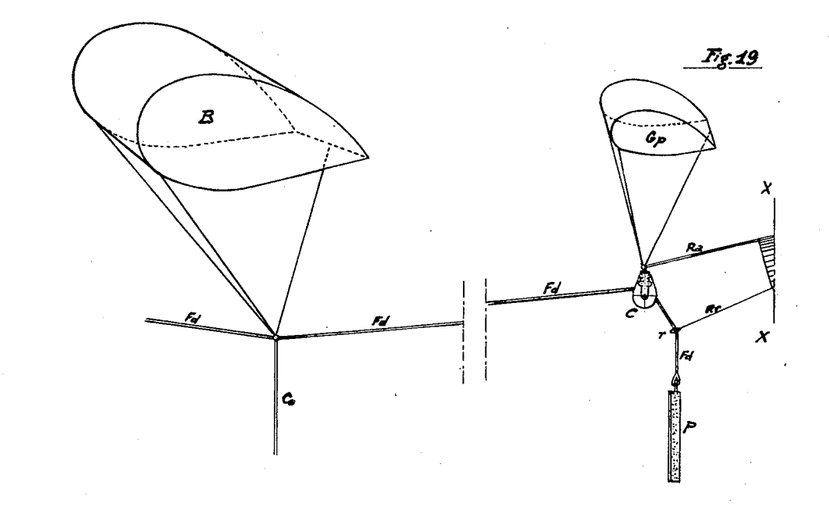
Figs. 19, 19ª are an enlarged elevational detail showing the extending device.
Figure 19A:
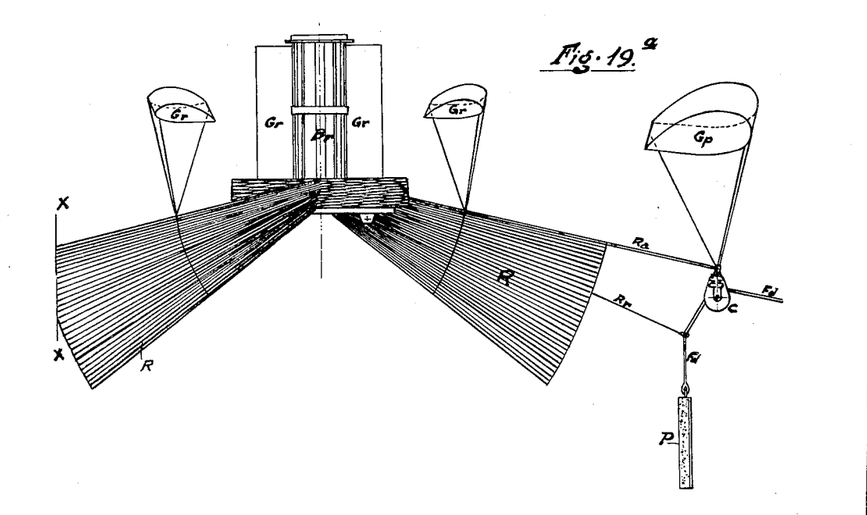
Figure 20:
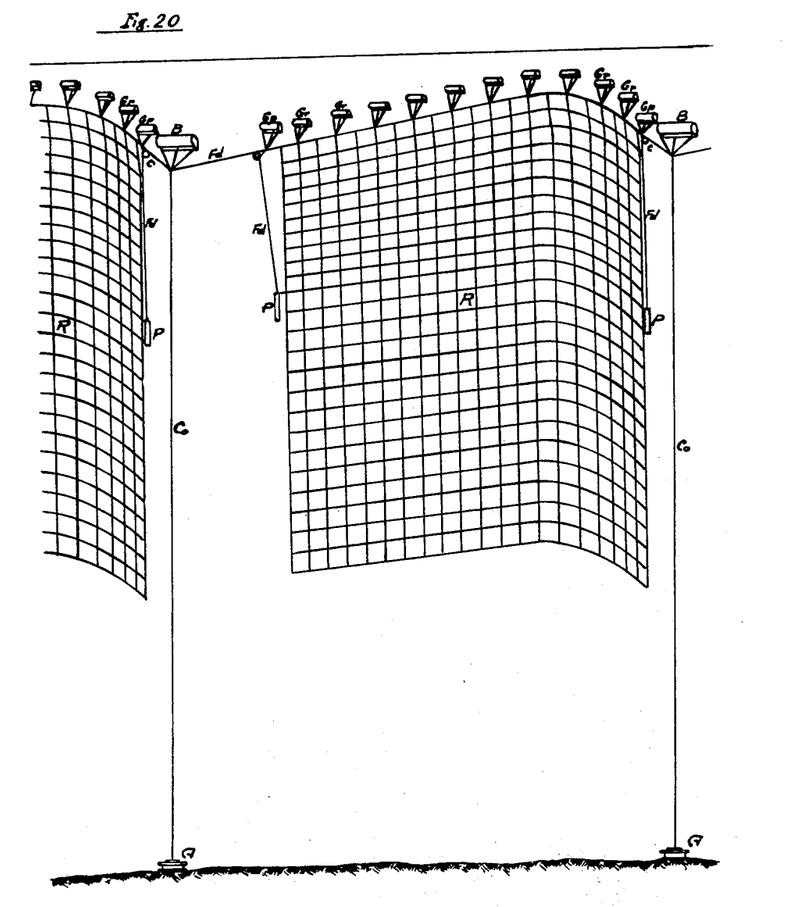
Figs. 20 and 21 show a barrier with net supported by floats with hydrodynamic upper thrust.
Figure 21:
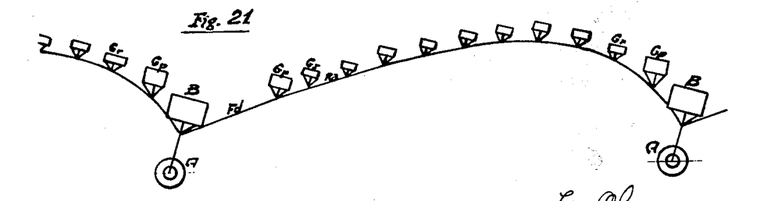

According to the invention, the barrier action under the action of the currents is further improved by giving to the longitudinal section of the floats (Figs. 14 to 21) a shape corresponding to the section of an aeroplane wing which, under the action of a current, permits of obtaining a useful dynamical effect viz. an upward thrust in addition to the mere hydrostatic thrust, and this with limited values of the horizontal thrust created by the current, especially by suitably rounding off the cross ends of the floats. A barrier, or even a mere explosive charge incorporated in the float, can be supported by a float standing under the action of a current if the float is shaped as just described, in the same manner as a kite standing in an air current can support even considerable loads. Of course it will always be necessary for the floats to possess a hydrostatic thrust sufficient to support the barrier in the water when no current is present. According to the invention, in order to place the floats shaped as described into the best conditions for reacting against the current in the said desired manner, the floats will also be equipped with rudders that permit the float to orientate itself according as the current direction changes; they will also be equipped with an attachment system insuring such an inclination of the float that a horizontal current will strike the float under a favorable angle of incidence and that will permit the most advantageous orientation of floats employed for the purpose abovesaid, whatever may be the direction of the currents. There shall be employed, for instance, an attachment system (Figs. 19—20—21) comprising three or more connecting links, each link being of appropriate length to secure the desired effect.

It should be pointed out that in the case of mines anchored in deep water, even if the mine form is such as to impart a hydrodynamic upward thrust, the downwardly pushing action of the currents generally is so great as to bring the explosive charges supported by the floats too low to permit them to be efficient against surface craft. In the case of continuous barriers, with top rope and auxiliary meshes against surface craft as described above, secured at their ends by floats anchored to the sea bottom and supported at intermediate points by auxiliary floats having the above described shape adapted to hold them up under the action of currents, a good portion of them will maintain themselves at the same depth allowing for a useful effect even against surface craft. In fact there will remain the undue lowering of the mooring floats caused by the horizontal and vertical strains exerted on the mooring floats and adding themselves to the horizontal and vertical strains of the auxiliary floats simply attached to the barrier. Yet the top rope or at least the center portion of the barrier will be carried upwardly towards the water surface by the increase in the upward thrust due to the hydrodynamic effect, and this by an amount sufficient to compensate, for the lowering of the mooring buoys, as clearly shown in Figs. 20 to 23.

By a suitable distribution of the auxiliary floats, for instance by concentrating on the auxiliary floats nearest to the mooring floats the greatest upward thrusts that can be obtained hydrodynamically, and by a rational proportioning of the thrusts of the various floats an approximately horizontal run of the center portion of the barrier can be obtained, this barrier portion being maintained very close to the desired depth.

Having now particularly described and ascertained the nature of my said invention and in what manner the same is to be performed, I declare that what I claim is:—

System and means for arming with explosive charges, for unwinding, extending and supporting subaqueous barriers, even consisting of a plurality of sections, characterized by the following:

1. A subaqueous barrier for use in war operations and the like including in combination, a plurality of mooring buoys, a plurality of barrier sections each of which is arranged between two mooring buoys, said buoys and barrier sections being adapted to be launched in the water, each barrier section including a floating bobbin a barrier portion normally mounted thereon and extensible therefrom and a device for extending the barrier portion comprising two ropes each of which is connected to adjacent mooring buoys, counterweights connected to the inner ends of the ropes and normally arranged on the bobbins, and float supported sheaves connected to the ends of the barrier portion and over which the floats carrying the counterweights pass.

2. A subaqueous barrier as claimed in claim 1, wherein a sheath is provided and formed of material adapted to disintegrate when subjected to a predetermined submersion in the water, said sheath being arranged about the barrier portion on the bobbin to prevent entanglement of the collapsible portion until after the extension thereof.

3. A subaqueous barrier in accordance with claim 1, the barrier portion being folded on the bobbin in loops so that the ends come to lie outside and when pulled allow the bobbin to remain still during the extension operation.

4. A subaqueous barrier in accordance with claim 1, wherein the device for extending each barrier section also includes a device embodying retarded releasers, and clamping and binding members which form a single solid body of the barrier extending device and the bobbin.

5. A subaqueous barrier in accordance with claim 1, wherein a connection link is provided to slide along the ropes leading to the net extending counterweights and connected with a suitable point of the net body.

6. A subaqueous barrier in accordance with claim 1, wherein a hold-back is provided on the rope leading to a counterweight working against the rope sheave so preventing either partially or wholly the lifting of the counterweight.

7. A subaqueous barrier in accordance with claim 1, wherein auxiliary meshes are provided for use against surface craft and include supporting floats arranged in the vicinity of the water surface, explosive charges detachably secured to the barrier, and cables connected with the explosive charges and associated with the floats for controlling the movement of the explosive charges towards the craft which strikes against the mesh.

8. A subaqueous barrier in accordance with claim 1, wherein an auxiliary mesh is provided above each barrier section and wherein breaking hooks are provided to permit the cable forming the auxiliary mesh when struck by a ship to detach from the barrier its ends undetachably connected with the explosive charges controlled by the said cable.

9. A subaqueous barrier in accordance with claim 1, wherein the floats employed in the building of the barrier are of streamline shape offering a minimum resistance to the water currents, and connecting devices between the floats and barrier permitting the floats to change their course to follow the change in the flow of the current.

10. A subaqueous barrier in accordance with claim 1, wherein the floats employed in the building of the barrier are each of such a shape susceptible of giving under currents an upwardly dynamic thrust, and connections between the floats and the barrier allowing the floats to steer a course in accordance with the change of flow of the current.

11. A subaqueous barrier in accordance with claim 1, wherein each barrier section is composed of ropes and wires with a section having a long symmetrical shape with the longer axis perpendicular to the barrier and of reduced resistance to current perpendicular to the barrier.

12. A subaqueous barrier in accordance with claim 1, wherein the floats for supporting the cable building the auxiliary meshes against surface craft are fitted with an adjustable hydrostatic device in order to stop the said floats at a predetermined depth below the water surface.

13. A subaqueous barrier in accordance with claim 1, wherein an auxiliary barrier mesh is arranged above each barrier section and include cables and wherein counterweights, pulleys and floats are provided to keep taut the cables forming the auxiliary meshes.

ENRICO OLMO.